(12) United States Patent
Shibano

(10) Patent No.: US 8,091,597 B2
(45) Date of Patent: Jan. 10, 2012

(54) HEAVY-DUTY TIRE WITH TREAD HAVING MIDDLE BLOCKS

(75) Inventor: Keizo Shibano, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 132 days.

(21) Appl. No.: 12/547,985

(22) Filed: Aug. 26, 2009

(65) Prior Publication Data
US 2010/0096055 A1 Apr. 22, 2010

(30) Foreign Application Priority Data
Oct. 17, 2008 (JP) .................................. 2008-268949

(51) Int. Cl.
*B60C 11/11* (2006.01)
*B60C 11/12* (2006.01)

(52) U.S. Cl. .......... 152/209.17; 152/209.18; 152/DIG. 3

(58) Field of Classification Search ............... 152/209.1, 152/209.15, 209.18, 209.22, 902, DIG. 3, 152/209.17
See application file for complete search history.

(56) References Cited

U.S. PATENT DOCUMENTS

| | | | | | |
|---|---|---|---|---|---|
| 6,000,450 | A | * | 12/1999 | Kishimoto et al. ........... | 152/902 |
| 6,003,575 | A | * | 12/1999 | Koyama et al. ............... | 152/902 |
| 2008/0053584 | A1 | * | 3/2008 | Ohara ....................... | 152/209.25 |
| 2009/0090445 | A1 | * | 4/2009 | Itou .......................... | 152/209.18 |

FOREIGN PATENT DOCUMENTS

| | | | |
|---|---|---|---|
| EP | 655353 | * | 5/1995 |
| JP | 4-310407 A | | 11/1992 |
| JP | 05-162511 | * | 6/1993 |
| JP | 8-80713 A | | 3/1996 |
| JP | 2002-046426 | * | 2/2002 |
| JP | 2004-026158 | * | 1/2004 |
| JP | 2005-289122 | * | 10/2005 |
| JP | 2005-289122 A | | 10/2005 |
| JP | 2008-56111 A | | 3/2006 |
| JP | 2006-103464 A | | 4/2006 |
| WO | 2007/072717 | * | 6/2007 |

OTHER PUBLICATIONS

Machine translation for Japan 2005-289122 (no date).*
Machine translation for Japan 2004-026158 (no date).*
Machine translation for Japan 2002-046426 (no date).*
Machine translation for Japan 05-162511 (no date).*

* cited by examiner

*Primary Examiner* — Steven D Maki
(74) *Attorney, Agent, or Firm* — Birch, Stewart, Kolasch & Birch, LLP

(57) ABSTRACT

A heavy-duty tire comprises two rows of middle blocks (11). The ground contacting face (S) of each middle block is defined as being surrounded with an axially inner longitudinal edge (14i), an axially outer longitudinal edge (14o), a first-side transverse edge (14a) and a second-side transverse edge (14b). The two transverse edges (14a and 14b) are substantially straight and substantially parallel with each other and inclined with respect to the tire axial direction. The axially inner longitudinal edge (14i) is nonlinear and has an axially inwardly protruding first-side protruding point (15a) and second-side protruding point (15b), and an axially outwardly denting part (16) therebetween. The axially outer longitudinal edge (14o) is nonlinear and has axially outwardly protruding first-side protruding point (20a) and second-side protruding point (20b), and an axially inwardly denting point (21) therebetween. The circumferential distances (Lia, Lib, Loa and Lob) between the protruding points (15a, 15b, 20a and 20b) and the adjacent circumferential ends (Pia, Pib, Poa and Pob) of the longitudinal edges (14i and 14o) are 5 to 15% of the circumferential length (Li, Lo) of the longitudinal edges (14i and 14o).

7 Claims, 6 Drawing Sheets

HEAVY-DUTY TIRE WITH TREAD HAVING MIDDLE BLOCKS

BACKGROUND OF THE INVENTION

The present invention relates to a pneumatic tire for heavy duty vehicles, more particularly to a tread pattern comprising four circumferential grooves and two circumferential rows of middle blocks, capable of reducing uneven wear occurring on one of the two circumferential rows.

Pneumatic tires fitted onto the drive shafts of a heavy duty vehicle, e.g. truck, bus and the like are required to have high traction performance, therefore, block-type tread patterns made up of blocks in five circumferential rows have been widely employed.

In the case of heavy duty vehicles, during empty running, the loads of the tires fitted onto the drive shaft are decreased to for example 40% of the maximum load for the tire. In other words, when compared with passenger car tires, variations of tire loads are very large. As a result, during empty running, due to the round tread profile, the ground contact pressure is increased in the center block row rather than the axially outermost shoulder block rows and middle block rows. In the middle block rows, accordingly, the amount of slippage against the road surface is increased, and so called punch wear—the middle blocks in one of the two rows wear faster than the other block rows—becomes liable to occur.

Conventionally, in order to reduce punch wear occurring on the middle blocks, so called tie bars are formed between the circumferentially adjacent middle blocks so as to support each other in the tire circumferential direction through the tie bars, to thereby increase the apparent rigidity of the middle blocks and reduce the amount of wear. But, it is difficult for the tie bars to reduce the punch wear till the tire users are fully satisfied. Further, if the volume of a tie bar between the middle blocks is increased, then the apparent rigidity of the middle blocks is increased, and the wear may be reduced, but the transverse groove between the middle blocks is blocked, and as a result, the traction performance is deteriorated.

The present inventor therefore, studied the distribution of wear energy over a middle block and found that, by adjusting the rigidity in each portion of the middle block according to the distribution of wear energy, the rigidity and wear energy are well balanced, and the punch wear of the middle blocks can be minimized without deteriorating the traction performance.

SUMMARY OF THE INVENTION

It is therefore, an object of the present invention to provide a heavy-duty tire, in which the rigidity of the middle block is adjusted according to the wear energy distribution, and the punch wear can be reduced without deteriorating the traction performance.

According to the present invention, a heavy-duty tire comprises a tread portion, the tread portion is, on each side of the tire equator, provided with axially inner and outer two circumferential grooves and transverse grooves extending therebetween so as to form middle blocks circumferentially arranged in one row, each of the middle blocks has a ground contacting face defined as being surrounded with an axially inner longitudinal edge, an axially outer longitudinal edge, a first-side transverse-edge and a second-side transverse edge, the first-side transverse edge extends substantially straight between a first-side circumferential end of the axially inner longitudinal edge and a first-side circumferential end of the axially outer longitudinal edge, while inclining with respect to the tire axial direction, the second-side transverse edge extends substantially straight between a second-side circumferential end of the axially inner longitudinal edge and a second-side circumferential end of the axially outer longitudinal edge in substantially parallel with the first-side transverse edge, the axially inner longitudinal edge is nonlinear and has an axially inwardly protruding first-side protruding point, an axially inwardly protruding second-side protruding point, and an axially outwardly denting part therebetween, wherein from the first-side protruding point to the denting part and from the second-side protruding point to the denting part, the axially inner longitudinal edge extends axially outwardly, the circumferential distance Lia from the first-side circumferential end to the first-side protruding point is in a range f from 5 to 15% of the circumferential length Li of the axially inner longitudinal edge, the circumferential distance Lib from the second-side circumferential end to the second-side protruding point is in a range f from 5 to 15% of the circumferential length Li of the axially inner longitudinal edge, the axially outer longitudinal edge is nonlinear and has an axially outwardly protruding first-side protruding point, an axially outwardly protruding second-side protruding point, and an axially inwardly denting point therebetween, wherein from the first-side protruding point to the denting part and from the second-side protruding point to the denting part, the axially outer longitudinal edge extends axially inwardly, the circumferential distance Loa from the first-side circumferential end to the first-side protruding point is in a range of from 5 to 15% of the circumferential length Lo of the axially outer longitudinal edge, the circumferential distance Lob from the second-side circumferential end to the second-side protruding point is in a range of from 5 to 15% of the circumferential length LO of the axially outer longitudinal edge.

In this application, the "first-side" and "second-side" mean "one side" and "the other side" in one circumferential direction of the tire, more specifically, these terms mean "heel-side" and "toe-side" (or vice versa) in one rotational direction of the tire.

DESCRIPTION OF THE PREFERRED EMBODIMENTS

Figure 1:
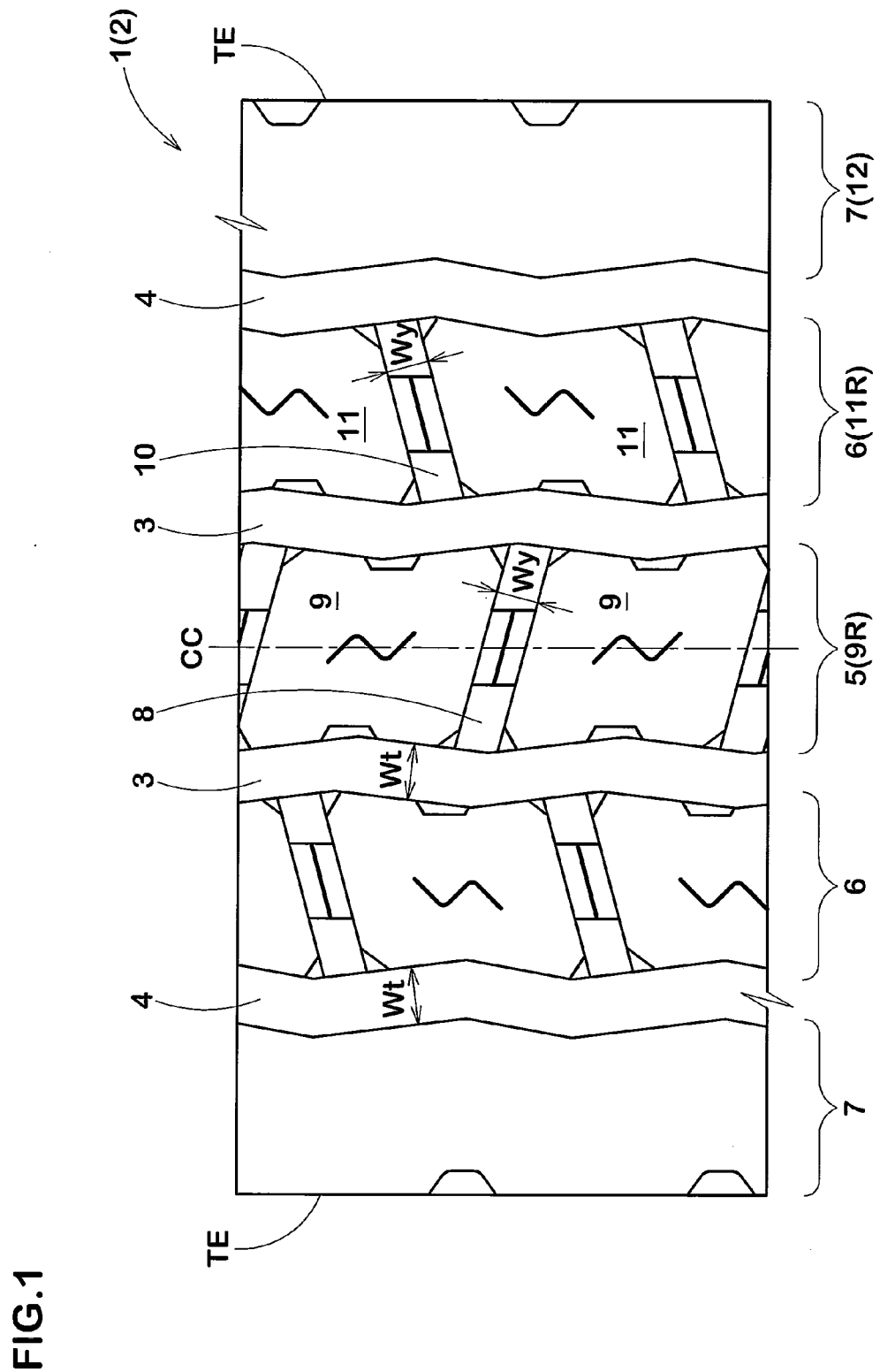
FIG. 1 is a developed partial plan view of a heavy-duty tire according to the present invention showing a tread pattern.

Embodiments of the present invention will now be described in detail in conjunction with accompanying drawings.

The heavy-duty tire 1 according to the present invention is a pneumatic tire. The pneumatic tire is as well known in the art, comprises a tread portion 2, a pair of axially spaced bead portions each with a annular bead core therein, a pair of sidewall portions extending between the tread edges and the bead portions, a carcass extending between the bead portions through the tread portion and sidewall portions, and a tread reinforcing belt disposed radially outside the carcass in the tread portion 2.

The tread portion 2 of the heavy-duty tire 1 is provided with two circumferential grooves 3 and 4 on each side of the tire equator CC, namely, an axially inner circumferential groove 3 and an axially outer circumferential groove 4 are disposed on each side of the tire equator CC, thereby the tread portion is axially divided into
one center ground contact zone 5 between the two axially inner circumferential grooves 3 and 3,
two middle ground contact zones 6 between the axially inner and outer circumferential grooves 3 and 4, and
two shoulder ground contact zones 7 between the axially outer circumferential grooves 4 and tread edges TE.

The tread portion 2 is further provided with center transverse grooves 8 and middle transverse grooves 10.

The center transverse grooves 8 extends across the entire width of the center ground contact zone 5 so as to circumferentially divide the center ground contact zone 5 into center blocks 9 in one circumferential row 9R.

The middle transverse grooves 10 extend across the entire width of each of the middle ground contact zones 6 so that each of the middle ground contact zones 6 is circumferentially divided into middle blocks 11 in one circumferential row 11R.

Each of the shoulder ground contact zones 7 is however, remained undivided in the circumferential direction, namely, remained as a circumferentially continuously extending rib 12 in this embodiment.

In this embodiment, the tread pattern is a block-rib pattern comprising three block rows 9R and 11R and two shoulder ribs 12. The circumferential grooves 3 and 4 are a zigzag groove made up of straight groove segments alternately inclined towards one axial direction and the other axial direction of the tire. The middle transverse grooves 10 on one side of the tire equator CC and the middle transverse grooves 10 on the other side of the tire equator CC are inclined to the same direction which is opposite to the inclining direction of the center transverse grooves 8. The tread pattern is therefore, a bi-directional tread pattern which is rotationally symmetric about a point on the tire equator.

In the following description, unless otherwise noted, the "groove width" means a width measured at the tread surface perpendicularly to the widthwise center line of the groove, and the "groove depth" means a depth measured from the tread surface to the deepest point in the groove bottom.

The circumferential grooves 3 and 4 in this embodiment have groove widths Wt in a range of from 8 to 15 mm, and groove depths Ht in a range of from 16 to 26 mm.

In view of the traction performance, the groove widths Wy of the transverse grooves 8 and 10 are preferably set in a range of from 6 to 10 mm.

In view of the block rigidity, the groove depths Hy of the transverse grooves 8 and 10 are preferably less than the groove depths Ht of the circumferential grooves 3 and 4.

The transverse grooves 8 are each provided therein with a tie bar 8A protruding from the groove bottom so that the circumferentially adjacent center blocks 9 can support each other.

Also, the transverse grooves 10 are each provided therein with a tie bar 10A protruding from the groove bottom so that the circumferentially adjacent middle blocks 11 can support each other.

Figure 2:
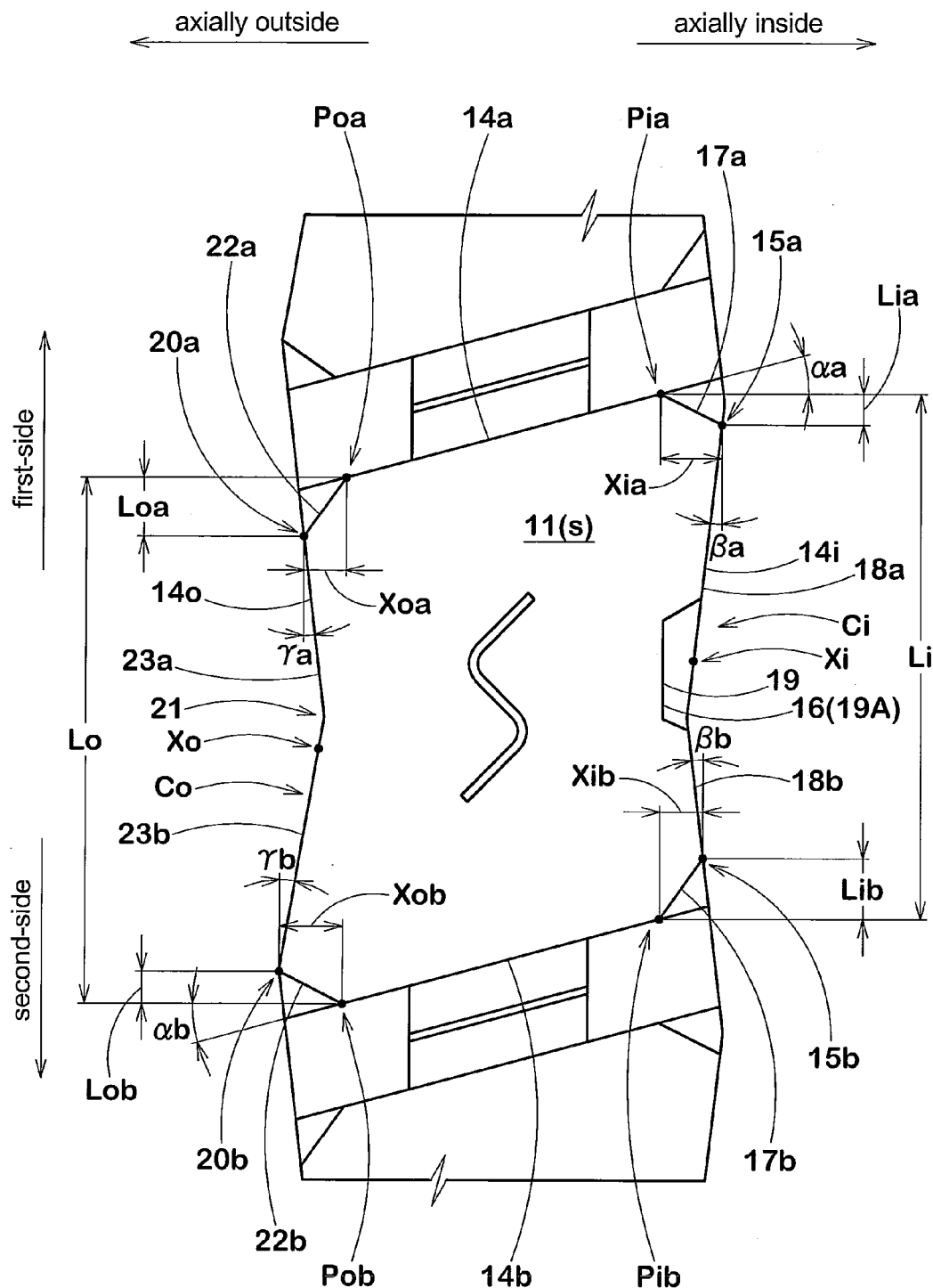
FIGS. 2 and 3 are plan views showing the same middle block.

The above-mentioned middle blocks 11 each have a ground contacting face s defined as being surrounded with an axially inner longitudinal edge 14$i$, an axially outer longitudinal edge 14$o$, a first-side transverse edge 14$a$, and a second-side transverse edge 14$b$ as shown in FIG. 2.

The first-side transverse edge 14$a$ is defined as extending substantially straight between the first-side circumferential end Pia of the axially inner longitudinal edge 14$i$ and the first-side circumferential end Poa of the axially outer longitudinal edge 14$o$, while inclining at an angle $\alpha$a in a range of from 10 to 20 degrees with respect to the tire axial direction.

The second-side transverse edge 14$b$ is defined as extending substantially straight between the second-side circumferential end Pib of the axially inner longitudinal edge 14$i$ and the second-side circumferential end Pob of the axially outer longitudinal edge 14$o$ while inclining at an angle $\alpha$b in a range of from 10 to 20 degrees with respect to the tire axial direction.

In this embodiment, the angle $\alpha$a is substantially equal to the angle $\alpha$b, and the first-side transverse edge 14$a$ is substantially parallel with the second-side transverse edge 14$b$.

The axially inner longitudinal edge 14$i$ is nonlinear and has an axially outwardly denting part 16 in the middle of the edge 14$i$ in the tire circumferential direction, a first-side protruding point 15$a$ protruding axially inwardly mostly on the first-side of the denting part 16, and a second-side protruding point 15$b$ protruding axially inwardly mostly on the second-side of the denting part 16.

The axially inner longitudinal edge 14$i$ is made up of:
a first-side outermost inclined segment 17$a$ extending substantially straight from the first-side circumferential end Pia to the first-side protruding point 15$a$, while inclining towards the second-side;
a first-side inner inclined segment 18$a$ extending substantially straight from the first-side protruding point 15$a$ to the denting part 16, while inclining axially outward;
a second-side outermost inclined segment 17$b$ extending substantially straight from the second-side circumferential end Pib to the second-side protruding point 15$b$, while inclining towards the first-side;
a second-side inner inclined segment 18$b$ extending substantially straight from the second-side protruding point 15$b$ to the denting part 16, while inclining axially outward; and
a central concave segment 19 defining the denting part 16 and extending between the first-side and second-side inner inclined segments 18$a$ and 18$b$, while denting axially outwards.

The central concave segment 19 forms the denting part 16 having an almost trapezoid shape of which a remote side 19A is parallel with the tire circumferential direction, and two oblique sides joint the inner inclined segments 18$a$ and 18$b$. The denting part 16 extends radially inwardly to a depth of 40 to 60% of the groove depth Ht of the adjacent circumferential groove 3, while substantially maintaining its the top shape.

The midpoint xi of the circumferential length Li of the axially inner longitudinal edge 14$i$ is positioned within the range of the circumferential length K of the denting part 16.

The axially outer longitudinal edge 14$o$ is nonlinear and has an axially inwardly denting point 21 in the middle of the edge 14$o$ in the tire circumferential direction, a first-side protruding point 20$a$ protruding axially outwardly mostly on the first-side of the denting point 21, and a second-side protruding point 20$b$ protruding axially outwardly mostly on the second-side of the denting point 21.

The axially outer longitudinal edge 14$o$ is made up of:
a first-side outermost inclined segment 22$a$ extending substantially straight from the first-side circumferential end Poa to the first-side protruding point 20$a$, while inclining towards the second-side;

a first-side inner inclined segment 23a extending substantially straight from the first-side protruding point 20a to the denting point 21, while inclining axially inward;

a second-side outermost inclined segment 22b extending substantially straight from the second-side circumferential end Pob to the second-side protruding point 20b, while inclining toward the first-side; and a second-side inner inclined segment 23b extending substantially straight from the second-side protruding point 20b to the denting point 21, while inclining axially inward.

The second-side inner inclined segment 23b is joined to the first-side inner inclined segment 23a at the denting point 21. In this embodiment, the midpoint xo of the circumferential length Lo of the axially outer longitudinal edge 14o is positioned near but slightly off the denting point 21 towards the second-side.

In the axially inner longitudinal edge 14i, the circumferential distance Lia from the first-side circumferential end Pia to the first-side protruding point 15a is set in a range of from 5 to 15% of the circumferential length Li of the axially inner longitudinal edge 14i, and the axial distance xia from the first-side circumferential end Pia to the first-side protruding point 15a is set in a range of from 1.0 to 3.0 times the circumferential distance Lia (the ratio Xia/Lia is from 1.0 to 3.0), also the circumferential distance Lib from the second-side circumferential end Pib to the second-side protruding point 15b is set in a range of from 5 to 15% of the circumferential length Li of the axially inner longitudinal edge 14i, and the axial distance xib from the second-side circumferential end Pib to the second-side protruding point 15b is set in a range of from 0.5 to 1.5 times the circumferential distance Lib (the ratio xib/Lib is from 0.5 to 1.5).

The angle βa of the first-side inner inclined segment 18a and the angle βb of the second-side inner inclined segment 18b are set in a range of from 5 to 15 degrees with respect to the tire circumferential direction.

It is preferable that the angle βa is substantially the same as the angle βb such that the absolute value of the difference therebetween |βa−βb| is not more than 2 degrees.

In the axially outer longitudinal edge 14o, the circumferential distance Loa from the first-side circumferential end Poa to the first-side protruding point 20a is set in a range of from 5 to 15% of the circumferential length Lo of the axially outer longitudinal edge 14o, and the circumferential distance Lob from the second-side circumferential end Pob to the second-side protruding point 20b is set in a range of from 5 to 15% of the circumferential length Lo of the axially outer longitudinal edge 14o. The angle γa of the first-side inner inclined segment 23a and the angle γb of the second-side inner inclined segment 23b are set in a range of from 5 to 15 degrees with respect to the tire circumferential direction.

It is preferable that the angle γa is substantially the same as the angle γb such that the absolute value of the difference therebetween |γa−γb| is not more than 2 degrees.

Further, it is preferable that the absolute value of the difference |βa−γa| between the angle βa and angle γa is not more than 2 degrees, and the absolute value of the difference |βb−γb| between the angle βb and angle γb is not more than 2 degrees.

As explained, since the first-side and second-side inner inclined segments 18a and 18b of the axially inner longitudinal edge 14i are inclined axially outwardly from the protruding points 15a and 15b to the denting part 16, and the first-side and second-side inner inclined segments 23a and 23b of the axially outer longitudinal edge 14o are inclined axially inwardly from the protruding points 20a and 20b to the denting point 21, the circumferential end portions of the middle block 11, where the slippage rate against the road surface is relatively large and the wear energy is accordingly relatively large, are increased in the block width and thereby the rigidity is increased so the wear can be inhibited.

On the other hand, a circumferential center portion of the middle block 11, where the wear energy relatively small, is decreased in the block width and thereby the rigidity is decreased. Therefore, in each of the circumferential end portions and center portion of the middle block, the rigidity is adjusted for the wear energy well-balancedly, and as a result, the wear of the middle block 11 as a whole can be minimized.

Especially, since the inner inclined segments 18a, 18b, 23a and 23b are substantially straight and inclined, the circumferential end portions of the middle block 11 become wider and the rigidity becomes increased when compared with such a case that at least one of the inner inclined segments 18a, 18b, 23a and 23b is not inclined with respect to the tire circumferential direction, namely, parallel with the tire equator CC. Further, when compared with such case, the middle block 11 becomes more flexible in the tire circumferential direction and thereby the middle block can follow the road surface more and the wear can be further decreased.

If the angles βa, βb, γa and γb of the inner inclined segments 18a, 18b, 23a and 23b are less than 5 degrees with respect to the tire circumferential direction, then the rigidity difference becomes very small, and it becomes difficult to adjust the rigidity to the wear energy in a well balanced manner. Further, the flexibility in the tire circumferential direction is decreased and becomes difficult to control the wear. If the angles βa, βb, γa and γb are more than 15 degrees, then the rigidity difference becomes too large, and again it becomes difficult to adjust the rigidity to the wear energy in a well balanced manner. Further, another type of uneven wear so called rail wear is liable to occur along the inner inclined segments 18a, 18b, 23a and 23b.

By forming the outermost inclined segments 17a, 17b, 22a and 22b on the middle block 11, the protruding points 15a, 15b, 20a and 20b are distant from the circumferential ends Pia, Pib, Poa abd Pob by the circumferential distances Lia, Lib, Loa and Lob, respectively, therefore, at the positions of the protruding points 15a, 15b, 20a and 20b and the circumferential ends Pia, Pib, Poa and Pob, the corners of the middle block 11 are prevented from becoming acute-angled corners. Thus, an extreme increase in the wear energy occurring at the acute-angled corners can be prevented.

Especially, since the first-side and second-side transverse edges 14a and 14b in this embodiment are substantially straight, when compared with such a case that the transverse edges 14a are 14b are curved, it can be avoided that the corners becoming more acute angled, and the variation of the wear energy can be lessened to improve the wear.

In this application, the expression "substantially straight" means not only "in a complete straight line" but also "in a curved line having a radius of curvature of not less than 200 mm".

If the distances Lia and Lib are less than 5% of the circumferential length Li and the distances Loa and Lob are less than 5% of the circumferential length Lo, then the wear energy at the corners of the middle block 11 becomes high.

If the distances Lia and Lib is more than 15% of the circumferential length Li and the distances Loa and Lob is more than 15% of the circumferential length Lo, then the rigidity of the circumferential end portions of the block becomes too low and becomes insufficient for the wear energy.

Since the first-side and second-side transverse edges 14a and 14b of the middle block 11 are inclined at the angles αa and αb in a range of from 10 to 20 degrees with respect to the tire axial direction, during rotation of the tire, the edge 14a, 14b gradually contacts with the road surface from one axial end to the other axial end and as a result the wear energy is reduced. If the angles αa and αb are less than 10 degrees, the wear energy can not be effectively reduced. If the angles αa and αb are more than 20 degrees, the traction performance decreases.

In this embodiment, the axially inner longitudinal edge 14i includes the central concave segment 19, but the axially outer longitudinal edge 14o does not include the central concave segment because in comparison with the axially outer longitudinal edge 14o, the axially inner longitudinal edge 14i is located close to the tire equator CC and the ground contact pressure thereof becomes large, and accordingly, the difference in the wear energy between the circumferential end portions and the circumferential central portion of the axially inner longitudinal edge 14i becomes more than that of the axially outer longitudinal edge 14o, therefore, in order to adjust the rigidity according to the wear energy, the rigidity of the circumferential central portion should be decreased on the axially inner longitudinal edge 14i side than the axially outer longitudinal edge 14o side by providing the central concave segment 19 only in the axially inner longitudinal edge 14i. In this case, as shown in FIG. 3, it is preferable that the circumferential length K of the central concave segment 19 is set in a range of from 20 to 30% of the circumferential length Li of the axially inner longitudinal edge 14i, and the axial distance Ti between the most denting point of the denting part 16 and an intersecting point J between an extended line of the first-side inner inclined segment 18a and an extended line of the second-side inner inclined segment 18b is set in a range of from 2 to 6 mm.

If the circumferential length K is less than 20% of the circumferential length Li, and if the axial distance Ti is less than 2 mm, then the central concave segment 19 becomes too small, therefore the above-mentioned effect by the central concave segment 19 can not be fully derived. If the circumferential length K is more than 30% of the circumferential length Li, and if the axial distance Ti is more than 6 mm, then the central concave segment 19 becomes too large, therefore, the rigidity balance is impaired.

Figure 3:
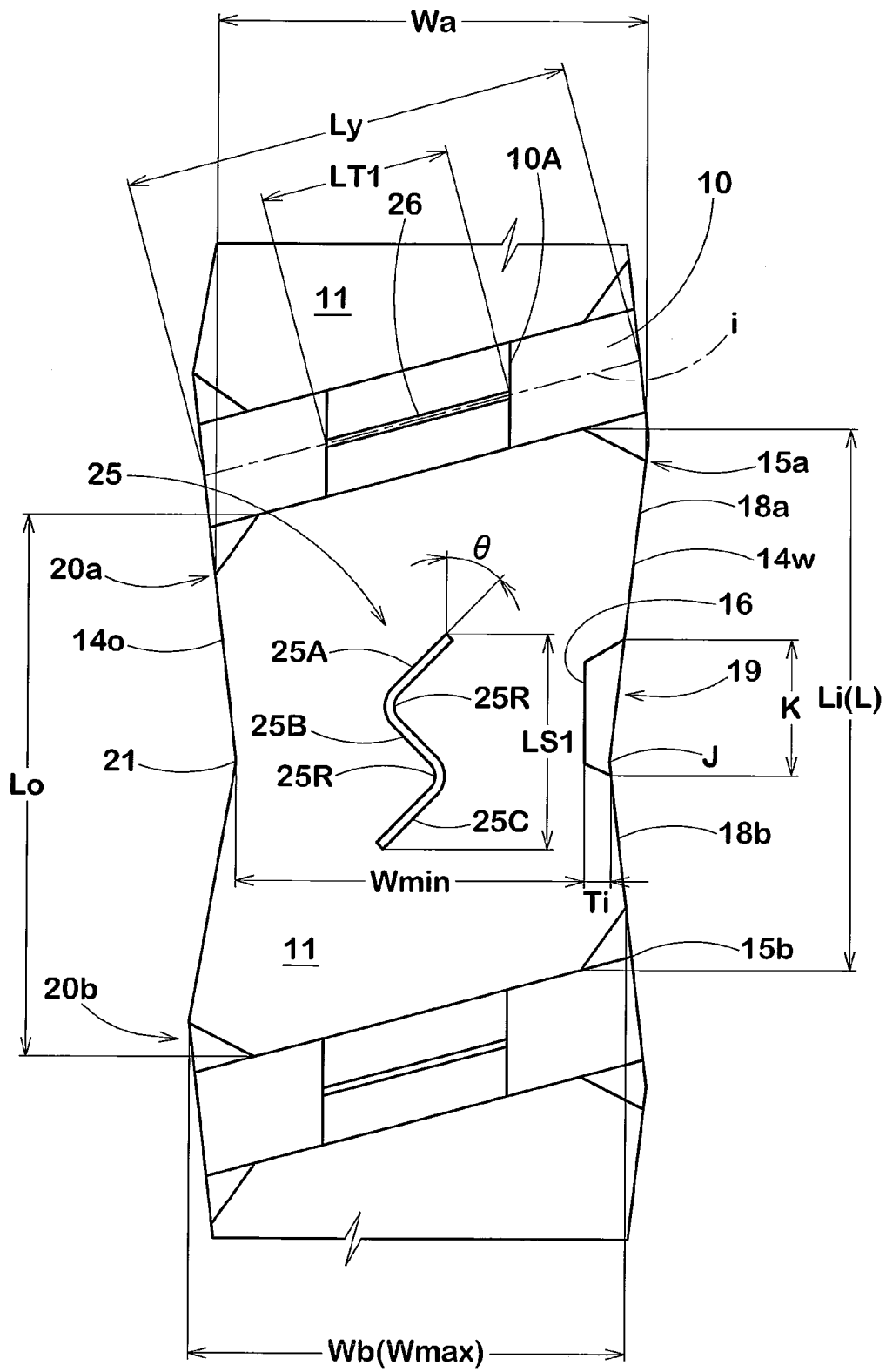

As shown in FIG. 3, the intersecting point J is positioned near but slightly on the first-side of the second-side end of the denting part 16 at which the denting part 16 meets the second-side inner inclined segment 18b.

The block-length L of the middle block 11 defined as one of the circumferential length Li of the axially inner longitudinal edge 14i and the circumferential length Lo of the axially outer longitudinal edge 14o which is not smaller than the other, is preferably set in a range of from 1.15 to 1.35 times the block maximum width Wmax of the middle block 11 defined as one of the axial distance Wa between the first-side protruding points 15a and 20a and the axial distance Wb between the second-side protruding points 15b and 20b which is not smaller than the other. Namely, the ratio L/Wmax is 1.15 to 1.35.

If L/Wmax is less than 1.15, since the distance between the circumferential end portions and circumferential central portion of the middle block is decreased and thereby the wear energy difference becomes small, the present invention can not fully exercise its function and effect.

If L/Wmax is more than 1.35, there arise a problem such that the traction performance remarkably decreases.

It is preferable that the block maximum width Wmax is in a range of from 1.15 to 1.35 times a block minimum width Wmin of the middle block defined by the axial distance between the denting part 16 and the denting point 21. Namely, the ratio Wmax/Wmin is 1.15 to 1.35.

If the ratio Wmax/Wmin is less than 1.15, then the rigidity difference between the circumferential end portions and central portion of the middle block decreases, and the wear energy balance is lost and the circumferential end portions are liable to wear.

If the ratio Wmax/Wmin is more than 1.35, then the rigidity difference is greatly increased, and the wear energy balance is lost and the circumferential central portion is liable to wear.

The middle block 11 is provided with a middle sipe 25 both ends of which are terminated within the middle block.

The middle sipe 25 is as shown in FIG. 3, made up of substantially straight three sipe segments 25A, 25B and 25C and arc sipe segments 25R connecting between the segments 25A, 25B and 25C.

The substantially straight sipe segments 25A, 25B and 25C are inclined alternately axially inward and outward at an angle θ of from 30 to 60 degrees with respect to the circumferential direction.

The arc sipe segments 25R have a radius of curvature of not less than 2.0 mm, and connect between the circumferentially adjacent substantially straight sipe segments smoothly without forming an inflection point to have a substantially Z shaped configuration. The circumferentially endmost segments 25A and 25C are inclined with respect to the tire axial direction towards the same direction as the first-side and second-side transverse edges 14a and 14b.

Preferably, the width of the middle sipe 25 is set in a range of from 0.5 to 1.0 mm.

The middle sipe 25 decreases the rigidity in the central portion of the middle block and thereby has merits that another uneven wear occurring along the inner inclined segments 18a, 18b, 23a and 23b as a result of excessive increase in the angles βa, βb, γa and γb can be controlled, while achieving a well balance between the block rigidity and wear energy.

Although, the middle block is stressed in every direction, by forming the middle sipe 25 in a z-shaped configuration, it becomes possible to prevent a large stress concentration and cracks liable to start from the sipe can be effectively prevented.

Figure 4:
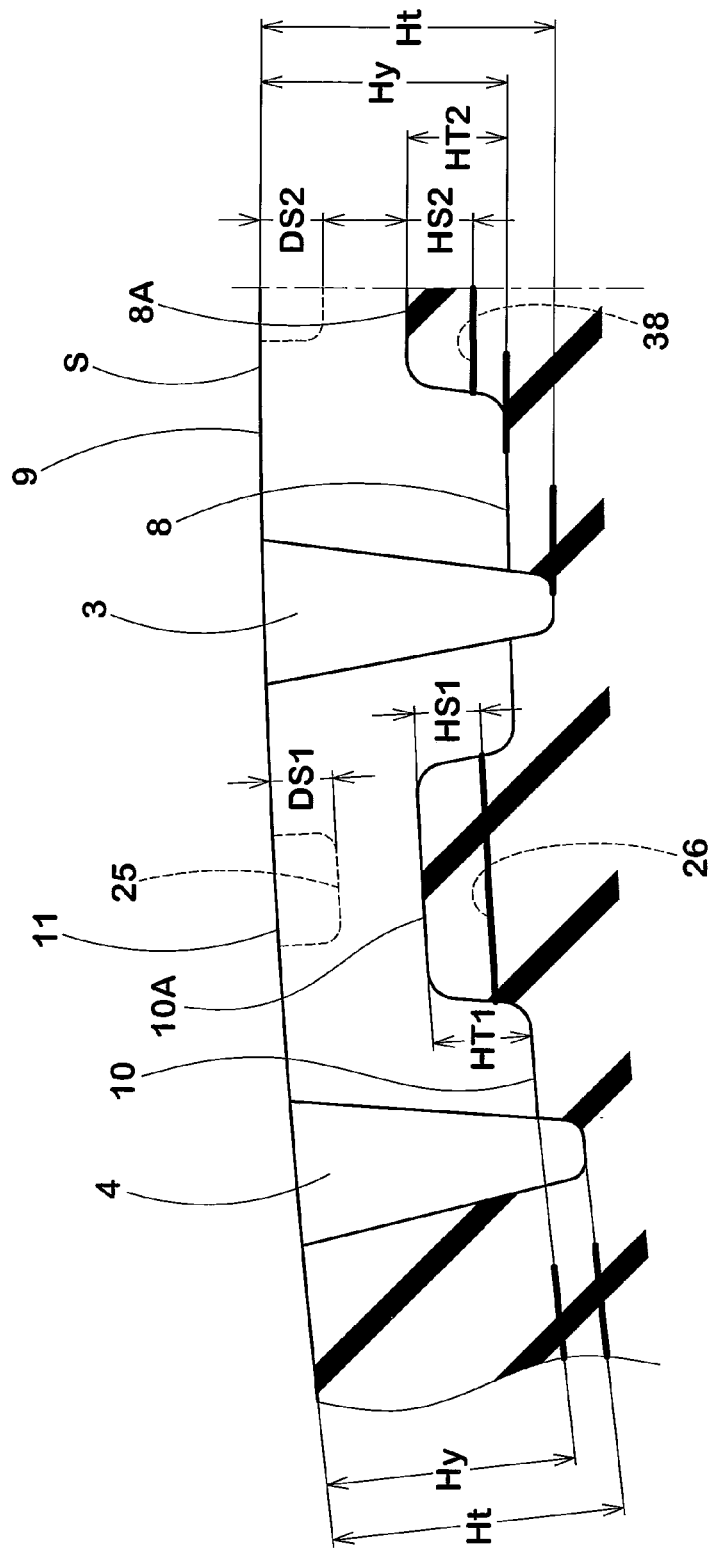
FIG. 4 is a partial cross sectional view of the tread portion of the heavy-duty tire.

Preferably, the middle sipe 25 has a circumferential length LS1 in a range of from 35 to 45% of the block-length L and a depth DS1 in a range of from 15 to 25% of the groove depth Ht as shown in FIG. 4.

If the sipe length LS1 is more than 45% of the block-length L, then the middle sipe 25 approaches the outermost inclined segments 17 and 22 and there is a tendency that the rigidity balance is lost.

If the sipe length LS1 is less than 35% of the block-length L, then the middle sipe 25 can not display the above-mentioned effects.

If the sipe depth DS1 is less than 15% of the groove depth Ht, then the middle sipe 25 can not display the above-mentioned effects.

If the sipe depth DS1 is more than 25% of the groove depth Ht, then the rigidity of the middle block as whole tends to become insufficient, and it becomes difficult to adjust the rigidity according to the wear energy distribution.

The tie bar 10A formed in the transverse grooves 10 helps to support the circumferentially adjacent middle blocks 11 each other to increase the rigidity of the middle blocks 11 and thereby the wear resistance and the traction performance can be improved.

As shown in FIG. 3, when measured along the widthwise center line i of the transverse groove 10, the length LT1 of the tie bar 10A is set in a range of from 30 to 50% of the length Ly of the transverse groove 10.

As shown in FIG. 4, when measured from the bottom of the transverse groove 10, the height HT of the tie bar 10A is set in a range of from 30 to 50% of the depth Hy of transverse groove 10.

If the tie bar length LT1 is less than 30% of the groove length Ly and/or the tie bar height HT is less than 30% of the groove depth Hy, then the tie bar 10A can not fulfill the above-mentioned function.

If the tie bar length LT1 is more than 50% of the groove length Ly and/or the tie bar height HT is more than 50% of the groove depth Hy, then the volume of the transverse groove 10 is excessively decreased, thus the drainage performance and the traction performance are not a little deteriorated.

The radially outer surface of the tie bar 10A is provided with a sipe 26 extending along the widthwise center line i over the entire length of the tie bar 10A, thereby, it is possible to make up for a deterioration of the traction performance due to the tie bar 10A, and the traction performance can be maintained.

Preferably, the depth HS2 of the sipe 26 measured from the radially outer surface of the tie bar 10A is set in a range of from 60 to 100% the tie bar height HT1 measured from the groove bottom.

In this embodiment, in order to minimize the wear in the row of the center blocks 9R, the rigidity of each portion of the center block 9 is adjusted according to the wear energy at the same portion similarly to the middle blocks 11.

Figure 5:
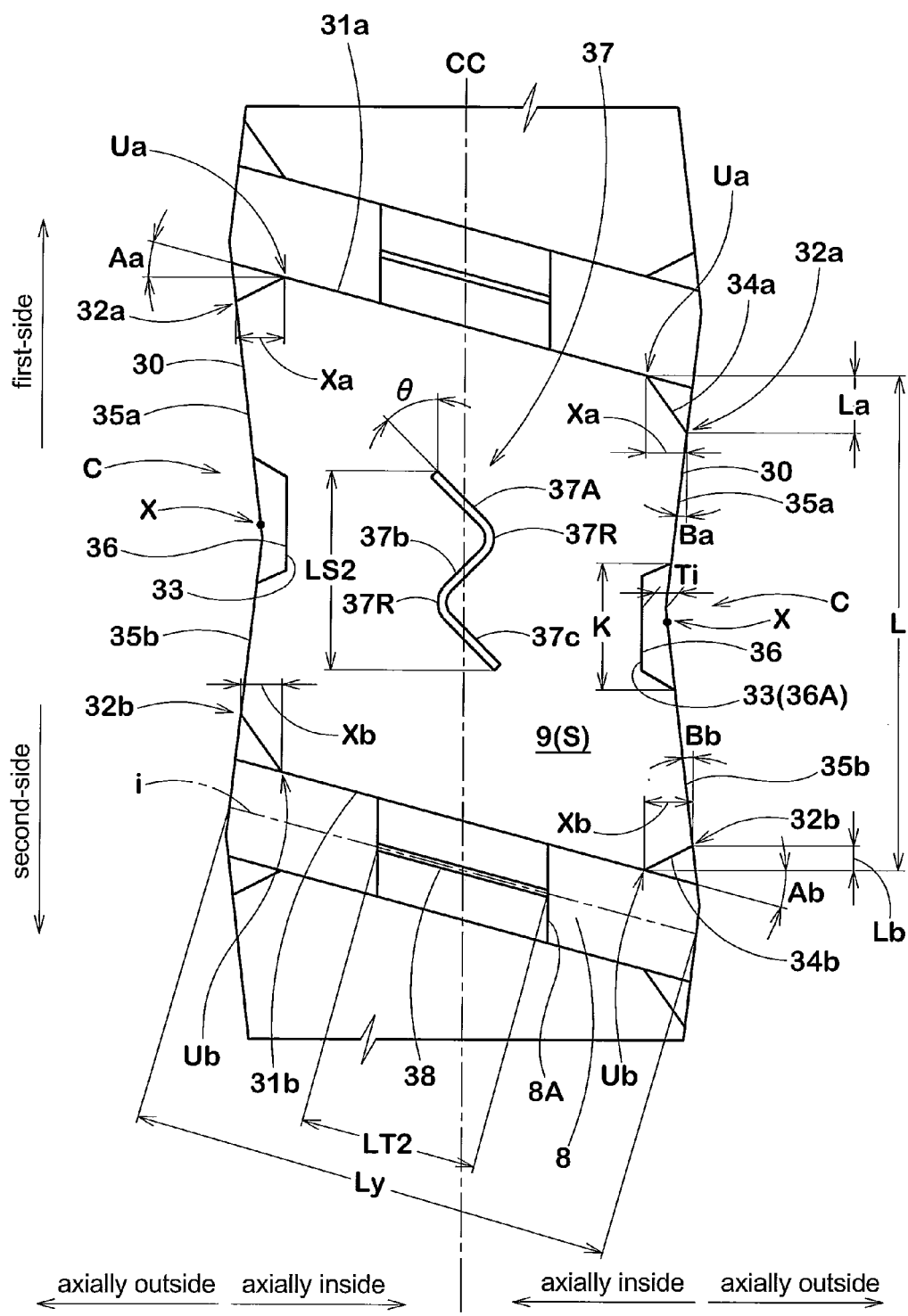
FIG. 5 is a plan view showing a center block.

As shown in FIG. 5, the center blocks 9 each have a ground contacting face s defined as being surrounded with a first-side transverse edge 31a, a second-side transverse edge 31b and two longitudinal edges 30 and 30 one on each side of the block 9 in the axial direction.

The first-side transverse edge 31a extends substantially straight between the first-side circumferential ends Ua of the two longitudinal edges 30, while inclining at an angle Aa of from 10 to 20 degrees with respect to the tire axial direction.

The second-side transverse edge 31b extends substantially straight between the second-side circumferential ends Ub of the two longitudinal edges 30, while inclining at an angle Ab of from 10 to 20 degrees with respect to the tire axial direction.

In this embodiment, the angle Aa is substantially equal to the angle Ab, and the first-side transverse edge 31a is substantially parallel with the second-side transverse edge 31b.

Each of the longitudinal edges 30 is nonlinear and has an axially inwardly denting part 33 in the middle of the edge 30 in the tire circumferential direction, a first-side protruding point 32a protruding axially outwardly mostly on the first-side of the denting part 33, and a second-side protruding point 32b protruding axially outwardly mostly on the first-side of the denting part 33.

Each of the longitudinal edges 30 is made up of a first-side outermost inclined segment 34a extending substantially straight from the first-side circumferential end Ua to the first-side protruding point 32a, while inclining toward the second-side;

a first-side inner inclined segment 35a extending substantially straight from the first-side protruding point 32a to the denting part 33, while inclining axially inward;

a second-side outermost inclined segment 34b extending substantially straight from the second-side circumferential end Ub to the second-side protruding point 32b, while inclining toward the first-side;

a second-side inner inclined segment 35b extending substantially straight from the second-side protruding point 32b to the denting part 33, while inclining axially inward; and a central concave segment 36 defining the denting part 33 and extending between the first-side and second-side inner inclined segments 35a and 35b, while denting axially inwardly.

From the first-side protruding point 32a to the denting part 33, and also from the second-side protruding point 32b to the denting part 33, the longitudinal edge 30 extends axially inwardly.

The central concave segment 36 forms the denting part 33 having an almost trapezoid shape of which a remote side 36A is parallel with the tire circumferential direction, and two oblique sides joint the inner inclined segments 35a and 35b.

The denting part 33 extends radially inwardly to a depth of 40 to 60% of the groove depth Ht of the adjacent circumferential groove 3, while substantially maintaining its the top shape. With respect to each of the longitudinal edges 30, the midpoint x of the circumferential length L of the longitudinal edge 30 is positioned within the range of the circumferential length K of the denting part 33.

In each of the longitudinal edges 30, the circumferential distance La from the first-side circumferential end Ua to the first-side protruding point 32a is set in a range of from 3 to 15% of the circumferential length L of the longitudinal edge 30, and the axial distance Xa from the first-side circumferential end Ua to the first-side protruding point 32a is set in a range of from 0.5 to 1.0 times of to the circumferential distance La, (namely, the ratio Xa/La is from 0.5 to 1.0), and also the circumferential distance Lb from the second-side circumferential end Ub to the second-side protruding point 32b is set in a range of from 3 to 15% of the circumferential length L of the longitudinal edge 30, and the axial distance Xb from the second-side circumferential end Ub to the second-side protruding point 32b is set in a range of from 1.0 to 3.0 namely, the ratio Xb/Lb is from 1.0 to 3.0). The angle Ba of the first-side inner inclined segment 35a and the angle Bb of the second-side inner inclined segment 35b are set in a range of from 3 to 10 degrees with respect to the tire circumferential direction.

Preferably, the angle Ba is substantially same as the angle Bb, and the absolute value of the difference |Ba−Bb| of the angle Ba from the angle Bb is not more than 2 degrees.

Since the center block 9 is constructed as explained above, the rigidity is increased in the circumferential end portions where the wear energy becomes higher, and the rigidity is decreased in the circumferential center portion where the wear energy is relatively low, thus in each portion of the center block, the rigidity can be adjusted according to the wear energy, and the wear of the center block 9 can be minimized.

The center block 9 is the same as the middle block 11 in the following aspects:

the angles Aa and Ab of the transverse edges 31a and 31b are in the range of from 10 to 20 degrees;

the circumferential distances La and Lb from the circumferential ends Ua and Ub to the protruding point 32a and 32b are in the range of from 3 to 15% of the circumferential length L;

the transverse edges 31a and 31b and the inner inclined segments 35a and 35b are substantially straight and inclined; and the angles Ba and Bb of the inner inclined segments 35a and 35b with respect to the tire circumferential direction are in the range of from 3 to 10 degrees.

In the center block 9, each of the longitudinal edges 30 is provided with the central concave segment 36 because of the following reason. Since the longitudinal edges 30 of the center blocks 9 are very near the tire equator CC, the ground contact pressure at the longitudinal edges 30 becomes larger, and as a result, the difference in the wear energy between the circumferential end portions and circumferential central portion becomes increased, therefore, by forming the central concave segment 36 on each of the longitudinal edges 30, the rigidity of the circumferential central portion is further decreased to consort with the wear energy in a well balanced manner.

Form this point of view, it is preferable that the circumferential length K of the central concave segment 36 is set in a range of from 20 to 30% of the circumferential length L of the longitudinal edge 30, and the axial distance Ti between the denting part and an intersecting point of an extended line of the first-side inner inclined segment 35a and an extended line of the second-side inner inclined segment 35b is set in a range of from 2 to 6 mm. And the intersecting point is positioned near the above-mentioned midpoint x of the circumferential length L of the longitudinal edge 30 in contrast to the middle block.

Each of the center blocks 9 is provided in its central portion with a center sipe 37. Similarly to the middle sipe 25, the center sipe 37 is made up of three substantially straight sipe segments 37A, 37B and 37C and arc sipe segments 37R connecting the three segments 37A, 37B and 37C.

The three substantially straight sipe segments 37A, 37B and 37C are inclined alternately axially inward and outward at an angle θ of from 30 to 60 degrees with respect to the circumferential direction.

The arc sipe segments 37R have a radius of curvature of not less than 2.0 mm and connect between the circumferentially adjacent substantially straight sipe segments smoothly without forming a inflection point so as to have a substantially Z shaped configuration.

The circumferentially endmost segments 37A and 37C are inclined with respect to the tire axial direction towards the same direction as the transverse edges 31a and 31b.

By the center sipes 37, uneven wear occurring along the inner inclined segments 35a and 35b as a result of excessive increase in the angles Ba, Bb can be controlled, while achieving a well balance between the block rigidity and wear energy. Further, the occurrence of cracks spreading to the center sipe 37 can be controlled.

It preferable that the circumferential length LS2 of the center sipe 37 is in a range of from 35 to 45% of the circumferential length L of the longitudinal edge 30, and the depth DS2 of the center sipe 37 from the tread surface is in a range of from 15 to 25% of the groove depth Ht.

The transverse grooves 8 are each provided therein with a tie bar 8A protruding from the groove bottom.

The length LT2 of the tie bar 8A measured along the widthwise center line i of the transverse groove 8 is set in a range of from 30 to 50% of the length Ly of the transverse groove 8. As shown in FIG. 4, the height HT2 of the tie bar 8A from the bottom of the transverse groove 8 is set in a range of from 30 to 50% of the depth Hy of the transverse groove 8.

The radially outer surface of the tie bar 8A is provided with a sipe 38 extending along the widthwise center line i over the entire length of the tie bar 8A.

The depth HS2 of the sipe 38 from the radially outer surface of the tie bar 8A is preferably set in a range of from 60 to 100% of the tie bar height HT2.

In this embodiment, the outermost inclined segments 17a, 17b, 22a, 22b, 34a and 34b are formed by intersecting lines of the ground contacting face S and triangular down-slope faces formed on the four corners of the block 11 and 9.

Comparison Tests

Figure 6:
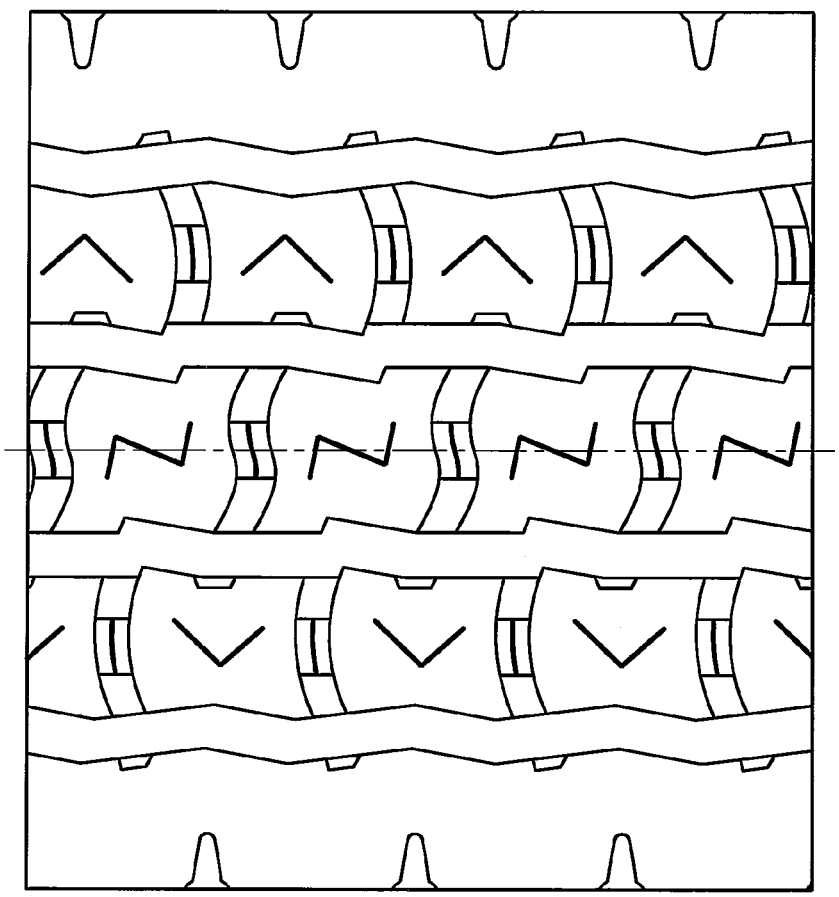
FIG. 6 shows a tread pattern of Ref. 1 tire used in the undermentioned comparison tests.

Heavy-duty tires of size 11R22.5 for trucks and buses having the basic tread pattern shown in FIG. 1 were made and tested for the traction performance and the resistance to punch wear and compared with a reference tire having the tread pattern shown in FIG. 6.

Specifications common to all the test tires are as follows.

Axially Inner Circumferential Grooves 3
  groove depth Ht=25.0 mm
  groove width Wt=11.0 mm
  distance of widthwise center from tire equator=28.0 mm Axially Outer Circumferential Grooves 4
  groove depth Ht=25.0 mm
  groove width Wt=12.0 mm
  distance of widthwise center from tire equator=76.0 mm Center Transverse Grooves 8
  groove width Wy=9.0 mm,
  groove depth Hy=21.0 mm, Middle Transverse Grooves 10
  groove width Wy=9.0 mm
  groove depth Hy=21.0 mm
  Number of Middle blocks in each row=56
  Number of center blocks in the row=56

Tie Bar 10A
  length LT1=16.0 mm
  height HT1=8.5 mm
  sipe depth HS1=6.5 mm Tie Bar 8A
  length LT2=16.0 mm
  height HT2=8.5 mm
  sipe depth HS2=6.5 mm Other specifications are shown in Table 1.

(1) Traction Performance Test:

The test tires mounted on standard rims of size 8.25×22.5 and inflated to 750 KPa were installed on a 2-DD truck (single front axle, double drive axles), and on a basalt road surface in a tire test course, 0-20 m time was measured with full acceleration, starting in third gear from idling engine speed. The results are indicated in Table 1 by an index based on Ref. 1 being 100, wherein the larger the index number, the better the traction performance.

(2) Resistance to Punch Wear Test:

After the above-mentioned truck run for 160,000 km, the middle blocks in two rows of each tire were visually checked for punch wear or uneven wear, and the number of worn middle blocks was counted. The rate of occurrence, namely, the counted number/the total number of middle blocks (56×2) is indicated in Table 1 in percentage.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Pattern | FIG. 6 | FIG. 1 | FIG. 1 | FIG. 1 | FIG. 1 | FIG. 1 | FIG. 1 | FIG. 1 | FIG. 1 | FIG. 1 |
| Middle blocks | | | | | | | | | | |
| transverse edge | arc | straight | straight | straight | straight | straight | straight | straight | straight | straight |
| angles $\alpha a$, $\alpha b$ (deg.) | — | 15 | 15 | 15 | 15 | 15 | 15 | 15 | 15 | 15 |
| axially inner longitudinal edge | | | | | | | | | | |
| outermost inclined segment | none | straight | straight | straight | straight | straight | straight | straight | straight | straight |
| Lia/Li | — | 0.06 | 0.05 | 0.15 | 0.06 | 0.06 | 0.06 | 0.06 | 0.06 | 0.06 |
| Lib/Li | — | 0.11 | 0.05 | 0.15 | 0.11 | 0.11 | 0.11 | 0.11 | 0.11 | 0.11 |
| Xia/Lia | — | 2.2 | 2.2 | 2.2 | 2.2 | 2.2 | 2.2 | 2.2 | 2.2 | 2.2 |
| Xib/Lib | — | 0.8 | 0.8 | 0.8 | 0.8 | 0.8 | 0.8 | 0.8 | 0.8 | 0.8 |
| inner inclined segment | | | | | | | | | | |
| angle $\beta a$:$\beta b$ (deg.) | 0:10 | 8:8 | 8:8 | 8:8 | 3:3 | 18:18 | 8:8 | 8:8 | 8:8 | 8:8 |
| central concave segment | ] shape | ] shape | ] shape | ] shape | ] shape | ] shape | ] shape | ] shape | ] shape | ] shape |
| K/Li | 0.24 | 0.26 | 0.26 | 0.26 | 0.26 | 0.26 | 0.1 | 0.4 | 0.26 | 0.26 |
| axial distance Ti (mm) | 4.0 | 4.0 | 4.0 | 4.0 | 4.0 | 4.0 | 1.0 | 7.0 | 4.0 | 4.0 |
| axially outer longitudinal edge | | | | | | | | | | |
| outermost inclined segment | — | straight | straight | straight | straight | straight | straight | straight | straight | straight |
| Loa/Lo | 0.13 | 0.11 | 0.11 | 0.11 | 0.11 | 0.11 | 0.11 | 0.11 | 0.11 | 0.11 |
| Lob/Lo | — | 0.06 | 0.06 | 0.06 | 0.06 | 0.06 | 0.06 | 0.06 | 0.06 | 0.06 |
| Xoa/Loa | 0.15 | 0.8 | 0.8 | 0.8 | 0.8 | 0.8 | 0.8 | 0.8 | 0.8 | 0.8 |
| Xob/Lob | — | 2.0 | 2.0 | 2.0 | 2.0 | 2.0 | 2.0 | 2.0 | 2.0 | 2.0 |
| inner inclined segment | straight | straight | straight | straight | straight | straight | straight | straight | straight | straight |
| angles $\gamma a$:$\gamma b$ (deg.) | 11:8 | 10:9 | 10:9 | 10:9 | 10:9 | 10:9 | 10:9 | 10:9 | 3:3 | 20:20 |
| middle sipe | V shape | Z shape | Z shape | Z shape | Z shape | Z shape | Z shape | Z shape | Z shape | Z shape |
| angle $\theta$ | 40 | 45 | 45 | 45 | 45 | 45 | 45 | 45 | 45 | 45 |
| length LS1 ratio <LS1/L> | 55 | 40 | 40 | 40 | 40 | 40 | 40 | 40 | 40 | 40 |
| depth DS1 ratio <DS1/Ht> | 0.2 | 0.2 | 0.2 | 0.2 | 0.2 | 0.2 | 0.2 | 0.2 | 0.2 | 0.2 |
| Center blocks | | | | | | | | | | |
| transverse edge | S-shape | straight | straight | straight | straight | straight | straight | straight | straight | straight |
| angle Aa, Ab (deg.) | — | 15 | 15 | 15 | 15 | 15 | 15 | 15 | 15 | 15 |
| both longitudinal edges | | | | | | | | | | |
| outermost inclined segment | — | straight | straight | straight | straight | straight | straight | straight | straight | straight |
| La/Li | — | 0.11 | 0.11 | 0.11 | 0.11 | 0.11 | 0.11 | 0.11 | 0.11 | 0.11 |
| Lb/Li | — | 0.05 | 0.05 | 0.05 | 0.05 | 0.05 | 0.05 | 0.05 | 0.05 | 0.05 |
| Xa/La | — | 0.7 | 0.7 | 0.7 | 0.7 | 0.7 | 0.7 | 0.7 | 0.7 | 0.7 |
| Xb/Lb | — | 2.3 | 2.3 | 2.3 | 2.3 | 2.3 | 2.3 | 2.3 | 2.3 | 2.3 |
| inner inclined segment | — | straight | straight | straight | straight | straight | straight | straight | straight | straight |
| angle Ba, angle Bb (deg.) | 10: (0.70) | 6 | 6 | 6 | 6 | 6 | 6 | 6 | 6 | 6 |
| central concave segment | none | ] shape | ] shape | ] shape | ] shape | ] shape | ] shape | ] shape | ] shape | ] shape |
| K/L | — | 0.26 | 0.26 | 0.26 | 0.26 | 0.26 | 0.26 | 0.26 | 0.26 | 0.26 |
| axial distance Ti (mm) | — | 4.0 | 4.0 | 4.0 | 4.0 | 4.0 | 4.0 | 4.0 | 4.0 | 4.0 |
| center sipes | Z shape | Z shape | Z shape | Z shape | Z shape | Z shape | Z shape | Z shape | Z shape | Z shape |
| angle $\theta$ | 80, 22, 80 | 45, 45, 45 | 45, 45, 45 | 45, 45, 45 | 45, 45, 45 | 45, 45, 45 | 45, 45, 45 | 45, 45, 45 | 45, 45, 45 | 45, 45, 45 |
| length LS2 ratio <LS2/L> | 0.52 | 0.40 | 0.40 | 0.40 | 0.40 | 0.40 | 0.40 | 0.40 | 0.40 | 0.40 |
| depth DS2 ratio <DS2/Ht> | 0.2 | 0.2 | 0.2 | 0.2 | 0.2 | 0.2 | 0.2 | 0.2 | 0.2 | 0.2 |
| Traction performance | 100 | 100 | 105 | 95 | 100 | 100 | 100 | 100 | 100 | 100 |
| Punch wear resistance | 30 | 5 | 20 | 20 | 25 | 25 | 20 | 20 | 25 | 25 |

Reference Signs List

| 1 | heavy-duty tire |
| 2 | tread portion |
| 3 | axially inner circumferential groove |
| 4 | axially outer circumferential groove |
| 6 | middle ground contact zone |
| 10 | middle transverse groove |
| 10A | tie bar |
| 11 | middle block |
| 11R | row of middle blocks |
| 14a | first-side transverse edge |
| 14b | second-side transverse edge |
| 14i | axially inner longitudinal edge |
| 14o | axially outer longitudinal edge |
| 15a | first-side protruding point |
| 15b | second-side protruding point |
| 16 | denting part |
| 17a | first-side outermost inclined segment |
| 17b | second-side outermost inclined segment |
| 18a | first-side inner inclined segment |
| 18b | second-side inner inclined segment |
| 19 | central concave segment |
| 19A | remote side |
| 20a | first-side protruding point |
| 20b | second-side protruding point |
| 21 | denting point |
| 22a | first-side outermost inclined segment |
| 22b | second-side outermost inclined segment |
| 23a | first-side inner inclined segment |
| 23b | second-side inner inclined segment |
| 25 | middle sipe |
| 25A, 25B, 25C | straight sipe segment |
| 25R | arc sipe segment |
| 26 | tie-bar sipe |

The invention claimed is:

1. A heavy-duty tire provided in a tread portion with an inner circumferential groove extending in the circumferential direction on each side of the tire equator, and an outer circumferential groove disposed on the axially outer side thereof, thereby forming a middle land zone between the inner and outer circumferential grooves, wherein said middle land zone is formed as a row of middle blocks in which a number of middle blocks sectionalized by lateral grooves intersecting the middle land zone are arranged at certain intervals in the circumferential direction;

a tread surface of the middle block is enclosed with
- an inner circumferential block edge on a side of said inner circumferential groove,
- an outer circumferential block edge on a side of said outer circumferential groove,
- a first-side axial block edge which connects a first-side circumferential end of said inner circumferential block edge and a first-side circumferential end of said outer circumferential block edge and which is inclined in a substantially linear fashion with respect to the tire axial direction, and
- a second-side axial block edge which connects a second-side circumferential end of said inner circumferential block edge and a second-side circumferential end of said outer circumferential block edge and which is substantially linear and substantially parallel to said first-side axial block edge;

said inner circumferential block edge comprises
- a first-side protruding point most protruding axially inwardly on the first-side of a central region in the circumferential direction which region includes a midpoint at which the circumferential length Li of said inner circumferential block edge is ½,
- a second-side protruding point most producing axially inwardly on the second-side of said central region in the circumferential direction, and
- a denting point most protruding axially outwardly between said first-side and second-side protruding points;

the inner circumferential block edge extends outward in the tire axial direction from said first-side and second-side protruding points to said denting point;

both of the circumferential distance Lia from said first-side circumferential end to said first-side protruding point and the circumferential distance Lib from said second-side circumferential end to said second-side protruding point are in a range of from 5 to 15% of the circumferential length Li of said inner circumferential block edge;

said outer circumferential block edge comprises
- a first-side protruding point most protruding axially outwardly on the first-side of the central region in the circumferential direction which region includes a midpoint at which the circumferential length Lo of said outer circumferential block edge is ½,
- a second-side protruding point most protruding axially outwardly on the second-side of said central region in the circumferential direction, and
- a denting point most protruding axially inwardly between said one-side and second-side protruding points;

the outer circumferential block edge extends inward in the tire axial direction from said first-side and second-side protruding points to said denting point;

both of the circumferential distance Loa from said first-side circumferential end to said first-side protruding point and the circumferential distance Lob from said second-side circumferential end to said second-side protruding point are in a range of from 5 to 15% of the circumferential length Lo of said outer circumferential block edge;

said inner circumferential block edge is made up of
- a first-side outermost inclined segment in a substantially linear-fashion extending from said first-side circumferential end to said first-side protruding point while inclining axially inward,
- a first-side inner inclined segment in a substantially linear-fashion extending from the first-side protruding point towards said denting point while inclining axially outward,
- a second-side outermost inclined segment in a substantially linear-fashion extending from said second-side circumferential end to said second-side protruding point while inclining axially inward,
- a second-side inner inclined segment in a substantially linear-fashion extending from said second-side protruding point towards said denting point while inclining axially outward, and
- a concave segment connecting between said first-side and second-side inner inclined segments, concaved axially outwardly in a U-shaped configuration, and including said denting point;

said outer circumferential block edge is made up of
- a first-side outermost inclined segment in a substantially linear-fashion extending from said first-side circumferential end to the first-side protruding point while inclining axially outward,
- a first-side inner inclined segment in a substantially linear-fashion extending from said first-side protruding point to said denting point while inclining axially inward,
- a second-side outermost inclined segment in a substantially linear-fashion extending from said second-side circumferential end to said second-side protruding point while inclining axially outward, and
- a second-side inner inclined segment in a substantially linear-fashion extending from said second-side protruding point to said denting point while inclining axially inward, thereby intersecting with said first-side inner inclined segment at said denting point;

the inclination angle $\alpha a$ of said first-side axial block edge with respect to the tire axial direction is in a range of from 10 to 20 degrees;

said middle block is provided with a single middle sipe whose both ends are terminated within the middle block; and the middle sipe is made up of
- three substantially-straight zigzag segments inclined axially inward and outward alternately at an angle $\theta$ of from 30 to 60 degrees with respect to the circumferential direction, and
- arc segments connecting said circumferentially adjacent zigzag segments smoothly and having a radius of curvature R of not less than 2.0 mm so as to have a substantially Z-shaped configuration.

2. The heavy-duty tire according to claim 1, wherein in said inner circumferential block edge, an angle $\beta a$ of said first-side inner inclined segment with respect to the circumferential direction and an angle $\beta b$ of said second-side inner inclined segment with respect to the circumferential direction are in a range of from 5 to 15 degrees; and in said outer circumferential block edge, an angle $ya$ of said first-side inner inclined segment with respect to the circumferential direction of and an angle $yb$ of said second-side inner inclined segment with respect to the circumferential direction are in a range of from 5 to 15 degrees.

3. The heavy-duty tire according to claim 1, wherein the circumferential length K of said concave segment is in a range of from 20 to 30% of the circumferential length Li of said inner circumferential block edge.

4. The heavy-duty tire according to claim 1, wherein in said inner circumferential block edge, a tire axial distance Ti between an intersection point, where extended lines of said first-side and second-side inner inclined segments intersect, and said denting point is in a range of from 2 to 6 mm.

5. The heavy-duty tire according to claim 1, wherein
a ratio L/W max of
- a block-length L defined as the circumferential length Li of the inner circumferential block edge or the circumferential length Lo of the outer circumferential block edge, whichever is larger and
- a block maximum width Wmax is defined as a tire axial distance Wa between the first-side protruding points or a tire axial distance Wb between the second-side protruding points, whichever is larger, between said inner and outer circumferential block edges is in a range of from 1.15 to 1.35.

6. The heavy-duty tire according to claim 1, wherein
a ratio Wmax/Wmin of
- a block maximum width Wmax defined as a tire axial distance Wa between the first-side protruding points or a tire axial distance Wb between the second-side protruding points, whichever is larger, between said inner and outer circumferential block edges and
- a block minimum width Wmin defined as a tire axial distance between said denting points is in a range of from 1.15 to 1.35.

7. The heavy-duty tire according to claim 1, wherein
in said inner circumferential block edge,
- a ratio Xia/Lia between a tire axial distance Xia from said first-side circumferential end to said first-side protruding point and said circumferential distance Lia is in a range of from 1.0 to 3.0, and
- a ratio Xib/Lib between a tire axial distance Xib from said second-side circumferential end to said second-side protruding point and said circumferential distance Lib is in a range of from 0.5 to 1.5, and in said outer circumferential block edge,
- a ratio Xoa/Loa between tire axial distance Xoa from said first-side circumferential end to said first-side protruding point and said circumferential distance Loa is in a range of from 0.5 to 1.5, and
- a ratio Xob/Lob between a tire axial distance Xob from said second-side circumferential end to said second-side protruding point and said circumferential distance Lob is in a range of 1.0 to 3.0.

* * * * *